(12) United States Patent
Miksch et al.

(10) Patent No.: US 12,190,598 B2
(45) Date of Patent: Jan. 7, 2025

(54) METHOD AND DEVICE FOR RECOGNIZING AN OBJECT FOR A VEHICLE INCLUDING A MONO CAMERA, AND CAMERA SYSTEM

(71) Applicant: Robert Bosch GmbH, Stuttgart (DE)

(72) Inventors: Michael Miksch, Renningen (DE); Gregor Schwarzenberg, Calw (DE)

(73) Assignee: ROBERT BOSCH GMBH, Stuttgart (DE)

( * ) Notice: Subject to any disclaimer, the term of this patent is extended or adjusted under 35 U.S.C. 154(b) by 288 days.

(21) Appl. No.: 17/841,085

(22) Filed: Jun. 15, 2022

(65) Prior Publication Data

US 2022/0406070 A1    Dec. 22, 2022

(30) Foreign Application Priority Data

Jun. 21, 2021  (DE) .................... 10 2021 206 316.0

(51) Int. Cl.
*G06K 9/00*   (2022.01)
*B60R 11/04*   (2006.01)
(Continued)

(52) U.S. Cl.
CPC ............ *G06V 20/56* (2022.01); *B60R 11/04* (2013.01); *B60W 30/09* (2013.01); *B60W 50/14* (2013.01);
(Continued)

(58) Field of Classification Search
CPC ...... G06V 20/56; G06V 10/26; G06V 10/764; B60R 11/04; B60R 2300/10; B60W 30/09;
(Continued)

(56) References Cited

FOREIGN PATENT DOCUMENTS

| CN | 106796648 A | * | 5/2017 | ............. B60K 37/02 |
| CN | 110007675 A | * | 7/2019 | ........... G05D 1/0221 |

(Continued)

OTHER PUBLICATIONS

Ondrus, et al.: How Do Autonomous Cars Work? In: J. Transportation Research Procedia, 44 (2020), pp. 226-223., ScienceDirect.
(Continued)

*Primary Examiner* — Xin Jia
(74) *Attorney, Agent, or Firm* — NORTON ROSE FULBRIGHT US LLP; Gerard A. Messina

(57) ABSTRACT

A method for recognizing an object includes reading in a first image signal that represents a first camera image recorded by a mono camera, and a second image signal that represents a second camera image recorded by the mono camera. First pixels situated on an image line of the first camera image are selected from the first image signal. Second pixels are identified from the second image signal, the second pixels corresponding to the first pixels. A flux signal is formed using the first pixels and the second pixels, the flux signal representing an optical flux profile for the first pixels situated along the image line. The flux profile represented by the flux signal is segmented into a plurality of segments, each of which represents a plane in the vehicle surroundings. An object signal that represents a recognized object is determined, using the plurality of segments.

12 Claims, 5 Drawing Sheets

(51) Int. Cl.
*B60W 30/09* (2012.01)
*B60W 50/14* (2020.01)
*G06T 7/194* (2017.01)
*G06T 7/73* (2017.01)
*G06V 20/56* (2022.01)

(52) U.S. Cl.
CPC ............... *G06T 7/194* (2017.01); *G06T 7/73* (2017.01); *B60R 2300/10* (2013.01); *G06T 2207/30252* (2013.01)

(58) Field of Classification Search
CPC . B60W 50/14; B60W 2420/403; G06T 7/194; G06T 7/73; G06T 2207/30252; G06T 2207/10016; G06T 2207/30261
See application file for complete search history.

(56) References Cited

FOREIGN PATENT DOCUMENTS

| | | | | | |
|---|---|---|---|---|---|
| CN | 110830711 | A | * | 2/2020 | ............... G06T 7/20 |
| CN | 110895674 | A | * | 3/2020 | ............ B60W 30/09 |
| CN | 109492609 | B | * | 5/2020 | ............... B60R 1/00 |
| DE | 102016014783 | A1 | | 7/2017 | |

OTHER PUBLICATIONS

Young, et al.: "Obstacle Detection for a Vehicle Using Optical Flow", Proceedings of the Intelligent Vehicles 92 Symposium. IEEE, (1992), pp. 185-190.

* cited by examiner

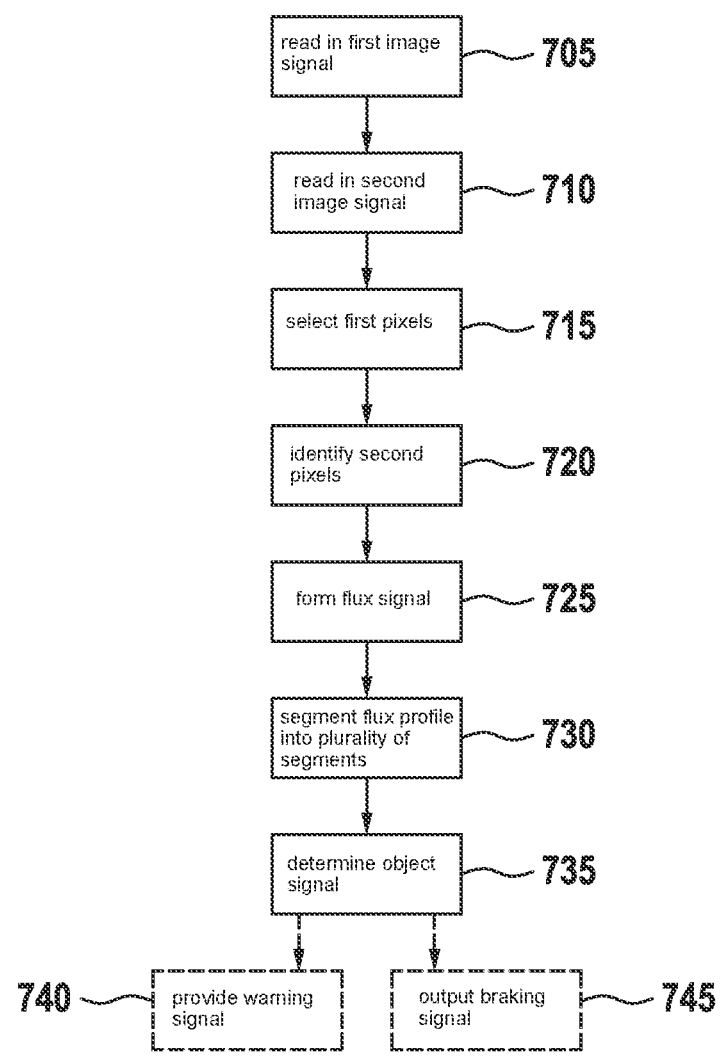

METHOD AND DEVICE FOR RECOGNIZING AN OBJECT FOR A VEHICLE INCLUDING A MONO CAMERA, AND CAMERA SYSTEM

CROSS REFERENCE

The present application claims the benefit under 35 U.S.C. § 119 of German Patent Application No. DE 10 2021 206 316.0 filed on Jun. 21, 2021, which is expressly incorporated herein by reference in its entirety.

FIELD

The present invention is directed to a device and a method for recognizing an object for a vehicle that includes a mono camera. Moreover, the present invention relates to a computer program.

BACKGROUND INFORMATION

In the field of driving assistance, surroundings detection devices are employed which are used to monitor the surroundings of the vehicle. Object recognition is essential for the monitoring, for example to avoid rear-end collisions.

German Patent Application No. DE 10 2016 014 783 A1 describes a method for detecting objects, images of the surroundings being captured with the aid of a stereo camera, objects in the captured images being detected with the aid of stereo image processing, and at least one learning-based evaluation method being used to evaluate the images.

SUMMARY

In accordance with the present invention, a method for recognizing an object for a vehicle that includes a mono camera, a device that uses this method, a camera system that includes such a device, and a corresponding computer program are provided. Advantageous refinements and enhancements of the present invention are disclosed herein.

Advantages that are achievable using the present invention include that, using image data from only one mono camera for a vehicle, an object may be recognized without knowledge of a proper motion of the vehicle and/or a motion state of the object to be recognized.

A method for recognizing an object for a vehicle that includes a mono camera is provided. In accordance with an example embodiment of the present invention, the method includes a step of reading in a first image signal, a step of reading in a second image signal, a step of selecting, a step of identifying, a step of forming, a step of segmenting, and a step of determining. In the step of reading in the first image signal, a first image signal is read in that represents a first camera image, recorded by the mono camera, that depicts the surroundings of the vehicle. In the step of reading in the second image signal, at least one second image signal is read in that represents a second camera image, recorded by the mono camera, that depicts the surroundings of the vehicle. In the step of selecting, first pixels situated on an image line of the first camera image are selected from the first image signal. In the step of identifying, second pixels are identified from the second image signal, the second pixels corresponding to the first pixels. In the step of forming, a flux signal is formed using the first pixels and the second pixels, the flux signal representing an optical flux profile for the first pixels situated along the image line. In the step of segmenting, the flux profile represented by the flux signal is segmented into a plurality of segments, each of which represents a plane in the vehicle surroundings. In the step of determining, an object signal that represents a recognized object is determined, using at least one of the plurality of segments.

This method may be implemented, for example, in software or hardware or in a mixed form made up of software and hardware, for example in a control unit.

By use of the described method of the present invention, recognizing the object with the aid of optical flux is advantageously possible during a very early image processing point in time. This is made possible by recognizing the object directly on the optical flux of the stated image line of the camera image. The image line may be predetermined, and may be a straight line. The first camera image and the second camera image may be camera images of the mono camera that follow one another in sequence, for example in direct chronological succession. The second pixels may depict the same object points in the second camera image as the first pixels in the first camera image. Flux vectors between mutually corresponding first pixels and second pixels may thus be determined. In the step of forming, the flux signal may thus be formed using the positions of the first pixels in the first image and the positions of the second pixels in the second image. The flux signal may represent an optical flux or, in other words, a vertical flux profile, for the first pixels situated along the image line. The flux profile may represent an optical flux value, a flux vector, for example, that has an algebraic sign and a value for each first pixel situated along the image line. For segmenting the flux profile, uniform sections may be searched for in the flux profile. A uniform section may be, for example, an at least approximately linear section. For example, the individual segments may represent linear sections in the flux profile having differing slopes. The segmenting may take place using a segmentation rule via which uniform sections in the flux profile may be searched for and selected as segments. If one of the segments has a predetermined characteristic that is associatable with an object, the presence of an object may be deduced from the presence of this segment.

In the step of selecting, the first pixels situated on the image line of the first camera image formed as an image column may be selected from the first image signal. By using only pixels of the first camera image that are situated in an image column, the object recognition may be carried out using minimal computing power. When the mono camera is aligned, for example, with a centrally oriented frontal visual range of the vehicle, an image column that is centrally situated in the camera image may likewise be selected in order to take into account a particularly informative area of the camera image, namely, the area toward which the vehicle is directly moving.

In accordance with an example embodiment of the present invention, it is also advantageous when in the step of segmenting, the flux profile is segmented using a model that is described via a homography. This allows a nonlinear profile of the optical flux along the image column to be modeled, on the basis of which an object may be clearly identifiable. Segments that are segmented during the segmenting may differ with respect to parameters that result from estimating the homography. By use of such different parameters, the segments may be associated with different camera image contents such as a background, an object, or a roadway depicted in the camera images. In particular, the modeling via a homography may be advantageous here to recognize nonlinearity in a segment, and to deduce from the parameters of the estimated homography what type of object is involved in the image section presently under consideration.

The homography, as homography parameters, may include an angle of the image line, a scaled vertical translation, and a scaled horizontal translation. These homography parameters may advantageously be used for segmenting the flux profile.

The translatory parameters describe, for example, the proper motion of the ego vehicle carrying the mono camera. The actual proper motion in movement direction z and in vertical direction y is scaled at distance d from the observed plane along its normal vector n. On the other hand, the orientation of the plane, i.e., the direction of the normal vector in relation to the z axis of the camera system of the mono camera, is estimated. An optimizer may estimate the orientation of a line, for example the image line, since a dimension reduction from plane to line is carried out via the column-by-column consideration. Consequently, the parameter has informative value concerning whether the estimated flux profile represents an object with a fronto-parallel orientation or a horizontal orientation. If the orientation is computed to be 0°, this indicates a plane with a fronto-parallel orientation, or indicates a horizontal plane if the orientation is 90°. The information about the orientation of a segment may thus be utilized to categorize stixels into object classes and roadway classes. A stixel represents an image area in which the flux has the same characteristic.

In the step of segmenting, the plurality of segments, which in each case as the plane, represent a background plane associated with a background, an object plane associated with an object, and/or a roadway plane associated with a roadway, may be segmented. Different depicted camera image contents such as a background, an object, or a roadway may thus be differentiated in different image planes. Object planes may be situated along the image column, for example between the roadway plane and the background plane. Segments that may be associated with the stated planes may differ from one another in a manner known in advance. Corresponding known distinguishing features may be similarly taken into account in the segmenting.

According to one specific example embodiment of the present invention, the flux profile may be subdivided into different areas in the step of segmenting in order to form the plurality of segments. For example, in the step of segmenting, the flux profile may be segmented into different areas that may differ with respect to parameters that result from the homography estimation. Nonlinear flux profiles are also described or modeled with the aid of the homography estimation. The resulting homography parameters from the homography estimation may be used in particular for an association or classification of the segment being considered in each case.

Steps of the described method may be carried out repeatedly in order to read in further image signals and to determine at least one further object signal. Thus, in one specific embodiment the method may include a step of reading in a third image signal, a step of reading in a fourth image signal, a step of further selecting, a step of further identifying, a step of further forming, a step of further segmenting, and a step of further determining. In the step of reading in the third image signal, a third image signal is read in that represents a third camera image, recorded by the mono camera, that depicts the surroundings of the vehicle. In the step of reading in the fourth image signal, at least one fourth image signal is read in that represents a fourth camera image, recorded by the mono camera, that depicts the surroundings of the vehicle. In the step of further selecting, third pixels situated on a further image line of the third camera image are selected from the third image signal, it being possible for the further image line to correspond to the image line. In the step of identifying, fourth pixels from the fourth image signal are identified, the fourth pixels corresponding to the third pixels. In the step of further forming, a further flux signal is formed using the third pixels and the fourth pixels, the further flux signal representing an optical flux profile for the third pixels situated along the further image line. In the step of further segmenting, the flux profile represented by the further flux signal is segmented into a plurality of further segments, each of which represents a further plane in the vehicle surroundings. In the step of further determining, the further object signal representing the recognized object or a further recognized object is determined, using the plurality of further segments. The repetition of the method steps may be carried out continuously during operation of the vehicle. The third camera image and the fourth camera image may be camera images of the mono camera that directly follow one another in sequence. Likewise, the second camera image and the third camera image may be camera images of the mono camera that directly follow one another in sequence. Changes in distance of the object with respect to the vehicle are recognizable via the repeated carrying out of the method steps, so that, for example, an undesirably great reduction in distance that may result in a rear-end collision is detectable.

The method may also include a step of providing, in which a warning signal is provided to a warning device of the driving assistance system, using the object signal. In the step of providing, for example using the object signal and the further object signal, the warning signal may be provided when, in the step of recognizing, the object that experiences or carries out a defined change in distance, for example a great reduction in distance from the vehicle, is recognized. The change in distance may be recognized by a comparison of the object signal to the further object signal. Via the warning signal, the driver may be provided, for example, with an acoustically, visually, and/or haptically perceivable indication of a hazardous situation.

According to one specific example embodiment of the present invention, it is also advantageous when the method includes a step of outputting, in which a braking signal is output to a braking device of the vehicle, using the object signal, in order to brake the vehicle. For example, in the step of outputting, using the object signal and the further object signal, the braking signal may be output when a defined change in the distance of the object from the vehicle is recognized, for example using a comparison of the object signal and the further object signal. Via the braking signal, in a hazardous situation the vehicle may be automatedly decelerated by emergency braking, for example.

Moreover, the approach presented here provides a device that is designed to carry out, control, or implement the steps of one variant of a method provided here in appropriate units. By use of this embodiment variant of the approach in the form of a device, the object underlying the present invention may also be achieved quickly and efficiently.

For this purpose, the device may include at least one processing unit for processing signals or data, at least one memory unit for storing signals or data, and at least one interface to a sensor or an actuator for reading in sensor signals from the sensor or for outputting data signals or control signals to the actuator and/or at least one communication interface for reading in or outputting data that are embedded in a communication protocol. The processing unit may be, for example, a signal processor, a microcontroller, or the like, it being possible for the memory unit to be a flash memory, an EEPROM, or a magnetic memory unit. The communication interface may be designed for reading in or outputting data wirelessly and/or in a hard-wired manner, it being possible for a communication interface to read in or output the hard-wired data electrically or optically, for example, from a corresponding data transmission line or output these data into a corresponding data transmission line.

In the present context, a device may be understood to mean an electrical device that processes sensor signals and outputs control and/or data signals as a function thereof. The device may include an interface that may have a hardware and/or software design. In a hardware design, the interfaces may be part of a so-called system ASIC, for example, which contains various functions of the control unit. However, it is also possible for the interfaces to be dedicated, integrated circuits, or to be at least partially made up of discrete components. In a software design, the interfaces may be software modules that are present, for example, on a microcontroller in addition to other software modules.

A camera system includes such a device and the mono camera for providing the first image signal and second image signal. Such a camera system may be used for reliable object recognition for a vehicle, using only a single mono camera.

Also advantageous is a computer program product or computer program including program code that may be stored on a machine-readable medium or memory medium such as a semiconductor memory, a hard disk, or an optical memory, and used for carrying out, implementing, and/or controlling the steps of the method according to one of the specific embodiments described above, in particular when the program product or program is executed on a computer or a device.

Exemplary embodiments of the present invention are illustrated in the figures and explained in greater detail in the following description.

BRIEF DESCRIPTION OF THE DRAWINGS

FIG. 7 shows a flowchart of a method according to one exemplary embodiment for recognizing an object for a mono camera for a driving assistance system for a vehicle.

DETAILED DESCRIPTION OF EXAMPLE EMBODIMENTS

Figure 1:
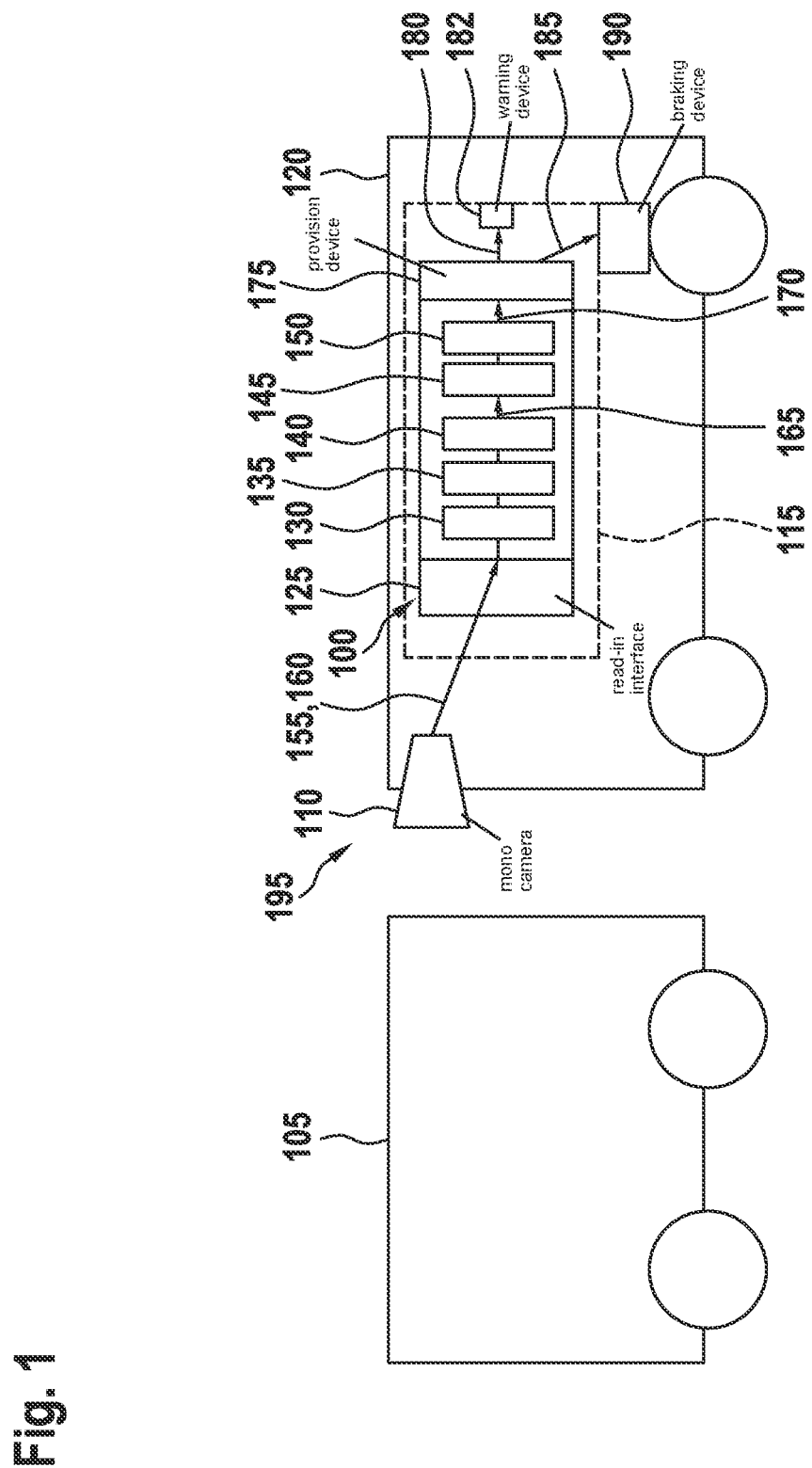
FIG. 1 shows a block diagram of a device according to one exemplary embodiment of the present invention for recognizing an object for a mono camera for a driving assistance system for a vehicle.

In the following description of advantageous exemplary embodiments of the present invention, identical or similar reference numerals are used for the elements having a similar action which are illustrated in the various figures, and a repeated description of these elements is dispensed with.

FIG. 1 shows a block diagram of a device 100 according to one exemplary embodiment. Device 100 may be used for recognizing an object 105 in conjunction with a mono camera 110. As an example, mono camera 110 is used for capturing data for a driving assistance system 115 of a vehicle 120.

Thus, according to this exemplary embodiment, device 100, strictly by way of example, is situated at or in vehicle 120, and in the present case is implemented in driving assistance system 115 of vehicle 120 as an example. Device 100 includes a read-in interface 125, a selection device 130, an identification device 135, a formation device 140, a segmentation device 145, and a determination device 150.

Read-in interface 125 is designed to read in a first image signal 155 representing a first camera image that is recorded by mono camera 110, and at least one second image signal 160 representing a second camera image that is recorded by mono camera 110. As an example, the camera images in each case depict the surroundings of vehicle 120, in the present case an area ahead of vehicle 120. The first camera image has been recorded at a first point in time, for example, and the second camera image has been recorded at a second point in time following the first point in time.

Selection device 130 is designed to select first pixels, situated on an image line of the first camera image, from first image signal 155. According to one exemplary embodiment, the image line is predetermined, for example a vertically extending straight line. Alternatively, for example a slightly obliquely extending straight line may be used.

Identification device 135 is designed to identify second pixels from second image signal 160, the second pixels corresponding to the first pixels. For example, the first pixels and the second pixels may correspond to one another in content. For example, those pixels in the second camera image that depict the same areas of the vehicle surroundings as the first pixels are picked out. Formation device 140 is designed to form a flux signal 165 using the first pixels and the second pixels, flux signal 165 representing an optical flux profile for the first pixels situated along the image line. Procedures of conventional methods for determining the optical flux may be relied on for identifying the second pixels and also for forming flux signal 165.

Segmentation device 145 is designed to segment the flux profile, represented by flux signal 165, into a plurality of segments. The segmenting is carried out in such a way that each of the segments represents a different plane in the vehicle surroundings.

Determination device 150 is designed to use at least one of the segments for determining an object signal 170. For example, a characteristic of the segments is compared to predetermined characteristics, which allow a deduction that the segment may be associated with an object to be recognized, in the present case object 105. An object to be recognized may be, for example, a person who is relevant for driving assistance system 115 or an object that is relevant for driving assistance system 115, such as a preceding vehicle. If such an object to be recognized is captured by mono camera 110, depicted in the camera images, and intersected by the stated image line, this results in a flux profile including a segment which, based on its characteristic, may be associated with the object to be recognized.

Figure 2:
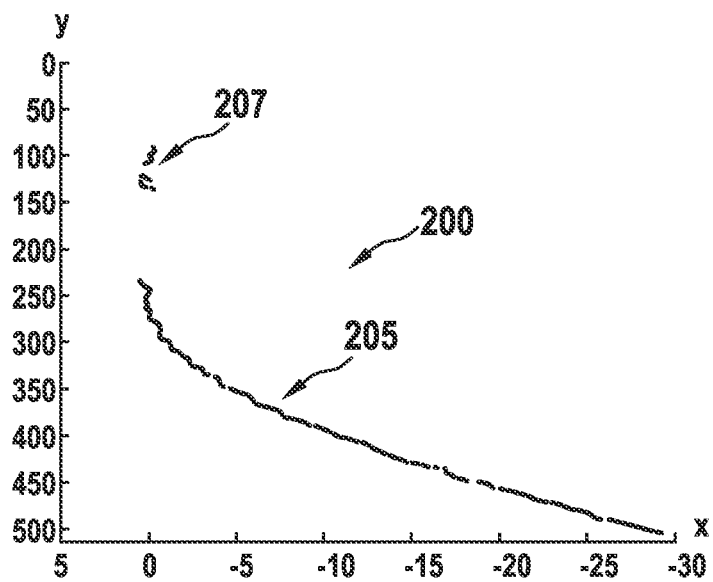
FIG. 2 shows a schematic illustration of a flux profile according to one exemplary embodiment of the present invention.
Figure 3:
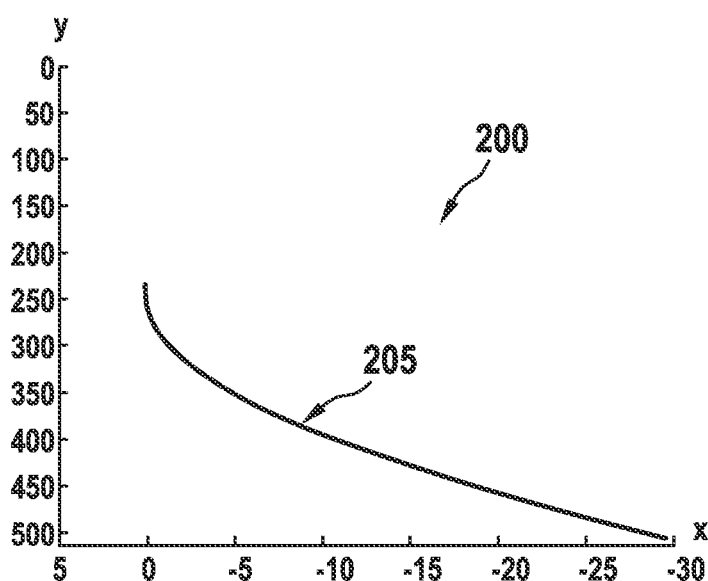
FIG. 3 shows a schematic illustration of a flux profile according to one exemplary embodiment of the present invention.
Figure 5:
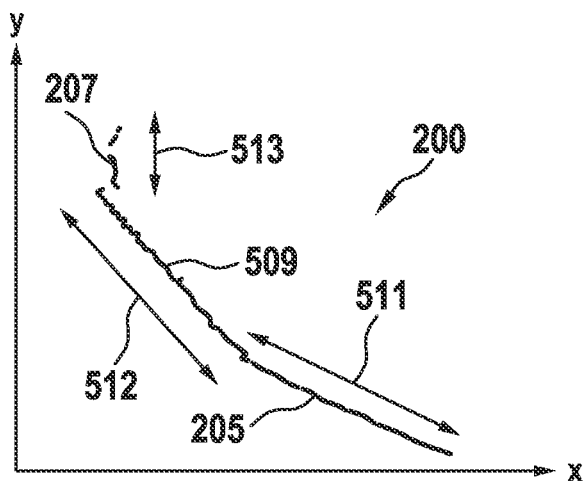
FIG. 5 shows a schematic illustration of a flux profile according to one exemplary embodiment of the present invention.
Figure 6:
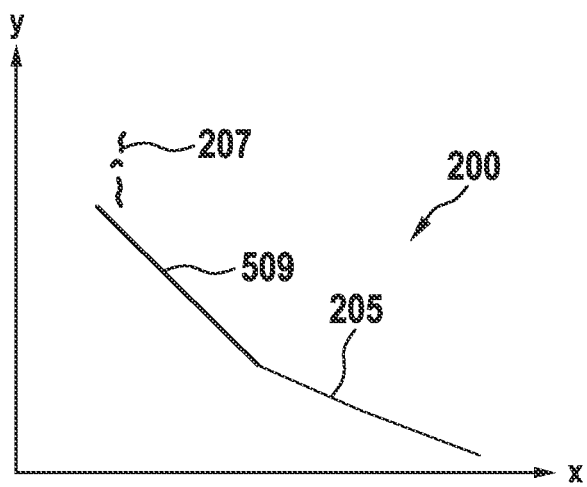
FIG. 6 shows a schematic illustration of a flux profile according to one exemplary embodiment of the present invention.

According to one exemplary embodiment, the first camera image and the second camera image are camera images of mono camera 110 that directly follow one another in sequence. According to this exemplary embodiment, formation device 140 is designed to form flux signal 165, using the positions of the first pixels in the first image and the positions of the second pixels in the second image. According to this exemplary embodiment, flux signal 165 represents an optical flux or in other words, a vertical flux profile, for the first pixels situated along the image line. According to one exemplary embodiment, the flux profile represents an optical flux value, for example a flux vector, that has an algebraic sign and a value for each first pixel situated along the image line. Such a vertical flux profile for a plane is shown in FIGS. 2 through 3, and for multiple planes is shown in FIGS. 5 through 6.

According to one exemplary embodiment, selection device 130 is designed to select from first image signal 155 the first pixels situated on the image line of the first camera image, formed as an image column. Thus, selection device 130 is designed, for example, to read out, as the first pixels, only the pixels that are situated in a predetermined image column or in a presently defined image column.

Figure 4:
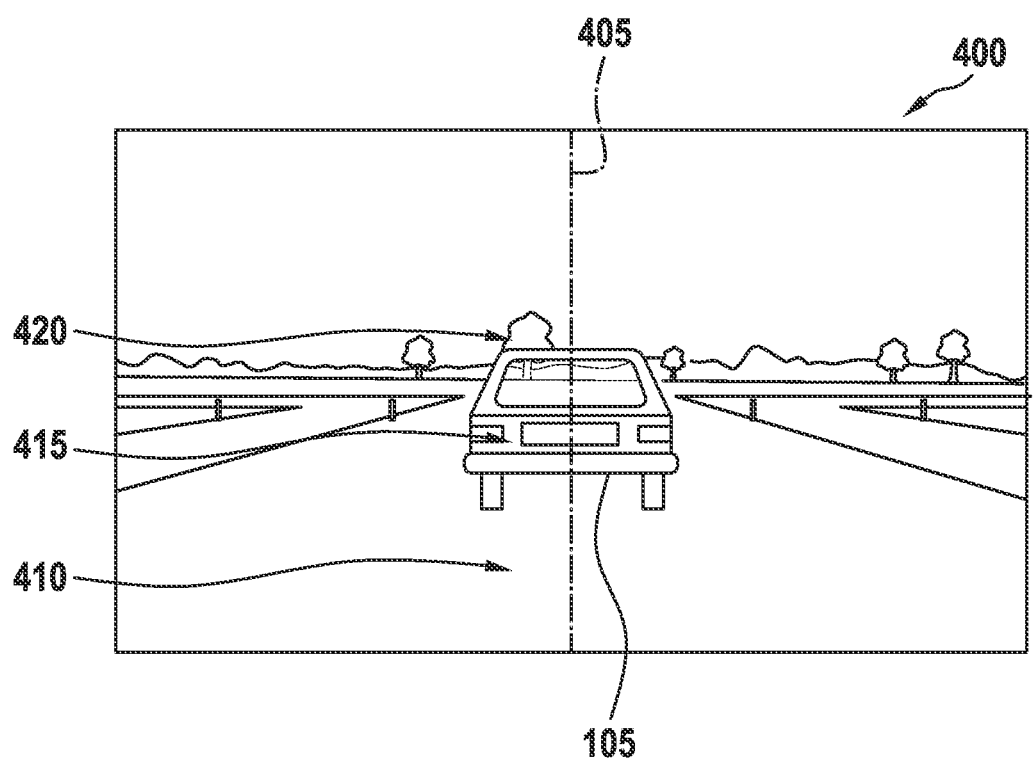
FIG. 4 shows a schematic illustration of a first camera image for use with a device according to one exemplary embodiment of the present invention.

When mono camera 110, according to one exemplary embodiment, is aligned with a centrally oriented frontal visual range of vehicle 120, according to one exemplary embodiment selection device 130 likewise selects an image column that is centrally situated in the first camera image (also cf. FIG. 4).

According to one exemplary embodiment, segmentation device 135 is designed to segment the flux profile, using a model that is described via a homography. According to one exemplary embodiment, segmentation device 135 is also designed to segment the plurality of segments, each of which represents a background plane associated with a background, an object plane associated with object 105, and/or a roadway plane associated with a roadway. For example, segmentation device 135 is designed to segment the flux profile using a segmentation rule in which predetermined characteristic profiles are stored in each case for the particular planes. When a section is found in the flux profile that may be associated with such a predetermined characteristic profile, this section is defined as a segment, for example. Additionally or alternatively, segmentation device 135 is designed, for example, to segment the flux profile into different areas as the plurality of segments. For example, segmentation device 135 segments the flux profile into different areas that include different homography parameters which result from the estimation of the homography (also cf. FIGS. 5 and 6).

According to one exemplary embodiment, device 100 is designed to read in further image signals and to determine at least one further object signal according to the preceding description. Object 105 may thus be tracked over an extended period of time. In addition, further objects may be recognized, or the recognition of object 105 may be safeguarded.

According to one exemplary embodiment, device 100 also includes a provision device 175 that is designed to provide a warning signal 180 to a warning device 182 of driving assistance system 115, using object signal 170 and/or a further object signal. For example, warning signal 180 is provided when object 105 is recognized as another vehicle that is experiencing or carrying out a defined change in distance, for example a great reduction in distance from vehicle 120. According to one exemplary embodiment, the change in distance is recognized by a comparison, carried out by determination device 150 or an additional comparison device, of object signal 170 to the further object signal, or via an algebraic sign of the segment of the flux profile associated with object 105. According to one exemplary embodiment, warning signal 180 effectuates a signal that is acoustically, visually, and/or haptically perceivable by the driver of vehicle 120.

According to one exemplary embodiment, provision device 175 is designed to output a braking signal 185 to a braking device 190 of vehicle 120, using object signal 170 and/or a further object signal, in order to brake vehicle 120. According to one alternative exemplary embodiment, device 100 includes its own output device for outputting braking signal 185. According to one exemplary embodiment, provision device 175 or the output device outputs braking signal 185 when a defined change in the distance of object 105 from vehicle 120 is recognized using a comparison of object signal 170 and the further object signal. According to one exemplary embodiment, braking device 190 effectuates emergency braking of vehicle 120, using braking signal 185.

A combined system made up of mono camera 110 and device 100 provided here may also be referred to as a camera system 195.

Device 100 provided here allows a method for detecting objects 105 to be carried out with the aid of optical flux.

Unlike conventional object recognition devices, device 100 does not require stereo data for the object recognition, for which purpose two cameras would be necessary, in order to be able to reconstruct depths of the setting in front of the camera. The object formation is based on the modeling of the setting in front of camera 110 as planes or, viewed along one dimension, columns, but for device 100 provided here is not represented along the depth information via straight-line models. A modification is made by use of a mono camera via which, in a first step, information concerning the optical flux is computed, i.e., the movement in the image of each individual pixel is estimated. With knowledge of the proper motion, this optical flux may be converted into inverse depth information, which for static objects in the setting is equivalent to the information that results from a stereo camera. However, such use of a mono camera 110 requires very accurate knowledge of the proper motion. Errors in estimating or measuring the proper motion result in very noisy depth values at the "focus of expansion," which is typically the image center for straight-ahead driving, and which thus are also present in disturbances in the object recognition. Since the central image area is very important for the object recognition in order to respond to collision-relevant objects 105, this is particularly disadvantageous. In addition, the conversion of the optical flux into the inverse depth results in valid depth values only for static objects. As soon as an object 105 is no longer static, i.e., is externally moved, for example vehicles that are passing or pedestrians/cyclists that are crossing the roadway, the object recognition must fall back on other features in order to ensure robust object recognition. The dependency on proper motion estimation, as well as the condition that relevant areas in the setting must be static, is advantageously bypassed using device 100, in that the object formation is carried out directly on the optical flux without further conversions.

Carrying out the object formation directly on the optical flux requires more complex modeling than the previous straight-line model, which has been used for the inverse depths for each column. According to this exemplary embodiment, the model utilized by device 100 is described via a nomography which enables modelling of the nonlinear profile of the optical flux along a column (also cf. FIGS. 2 through 6). Homography, also referred to as "projectivity," in mathematics describes a collineation of the two-dimensional real projective space with itself. In the mathematical areas of geometry and linear algebra, collineation refers to bijective imaging of an affine or projective space onto itself, in which each straight line is imaged onto a straight line, i.e., is linearly true. The set of collineations of a space forms a group, and in particular the inversions of collineations are always collineations. In geometry, projectivity or projective collineation is a special collineation of a projective plane or a projective space. In the simplest case, projectivity is central collineation or perspectivity; i.e., there is one fixed point that is the center, and all straight lines through the fixed point are fixed straight lines.

Using device 100, it is thus possible to obtain an object formation without the need for a stereo camera or proper motion estimation, via which for mono cameras 110 in particular, the central image area may be robustly subjected to the object detection. The modeling via a homography also allows modeling of externally moved objects, since the modeling with the aid of homography has no underlying assumption regarding the movement of the foreign objects.

Use of the method carried out by device 100 is verifiable, for example, with the aid of virtual flux using a monitor, for example, or also via the known cases of flux ambiguity such as shadowing, projections onto surfaces, rotating objects, etc.

FIG. 2 shows a schematic illustration of a flux profile 200 according to one exemplary embodiment. This may be a flux profile 200 that has been generated using device 100 described with reference to FIG. 1. A vertical flux profile 200 with respect to an image column is shown. Flux profile 200 is based, for example, on camera images of a mono camera depicting an open roadway situated ahead of a vehicle. The x axis denotes the vertical flux in pixels, and the y axis denotes the image rows in pixels.

Flux profile 200 may be segmented into two segments 205, 207, each of which includes characteristic profiles. Segment 205, based on its characteristic profile, is associatable with the roadway plane. Segment 207, based on its approximately vertical profile, is associatable with the horizon. It may be deduced from flux profile 200 that only a roadway or other relatively flat surface, and no object, is depicted in the camera images. According to this exemplary embodiment, in particular the profile of the flux on the roadway plane is nonlinear. This nonlinearity may be exactly described via the nomography.

FIG. 3 shows a schematic illustration of a flux profile 200 according to one exemplary embodiment. This may be flux profile 200 described in FIG. 2, segment 205 being illustrated as a solid line that represents estimated flux profile 200 for the depicted roadway.

FIG. 4 shows a schematic illustration of a first camera image 400 according to one exemplary embodiment. This may be an image that is captured by the mono camera shown in FIG. 1, which together with a second image that is captured by the same mono camera is used for recognizing an object 105.

An image line 405 by way of example is marked extending centrally and vertically in first camera image 400. In this case, first pixels situated on image line 405 of first camera image 400 are situated in an image column 405 of first camera image 400.

A traffic setting is depicted by way of example in first camera image 400. Image line 405 extends through a roadway plane 410 of the roadway in a lower image section of first camera image 400. In a center image section of first camera image 400, image line 405 extends through a depiction of object 105, in the present case in the form of a further vehicle, and thus through an object plane 415. In an upper image section of first camera image 400, image line 405 extends through a background representation of a background, and thus through a background plane 420. The optical flux profile for image line 405, resulting from first camera image 400 and a second camera image, is shown in FIGS. 5 and 6.

FIG. 5 shows a schematic illustration of a flux profile 200 according to one exemplary embodiment. This may be flux profile 200 described in FIG. 2, with the difference that flux profile 200 for the image line of the first camera image described in FIG. 4 is illustrated, in which not only the roadway and the horizon, but also the object situated on the roadway are/is depicted. In addition to segment 205 that is associatable with the roadway plane and segment 207 that is associatable with the background plane, flux profile 200 therefore includes an additional segment 509 that is associatable with the object plane.

Corresponding vertical flux profile 200 is shown, which as input data is entered, for example, into a method that is carried out by the device shown in FIG. 1. According to this exemplary embodiment, the segmentation device of the device segments flux profile 200 into different areas 511, 512, 513. Areas 511, 512, 513 have different homography parameters which result from the estimation of the homography. These parameters indicate, for example, an orientation in space, which may then be utilized to classify segments 205, 207, 509, for example as "roadway" or "object."

The homography here is a one-dimensional homography, since in the present case only the transformation of a straight line, not of a plane, is considered. The homography includes three parameters that describe the homography. These homography parameters are the normal direction, or in general the angle of the image line presently under consideration, for example an image column, about a scaled vertical translation and about a scaled horizontal translation.

To ascertain these parameters, for example an optimization problem is solved which adapts the parameters to the extent that the homography in question describes the flux profile in the image line in the best possible way. There are many options for establishing where an object boundary is present, for example between an object on the roadway and the roadway itself. The important thing is the possibility during the optimization to categorize the image line presently under consideration, for example the column, into different areas, each of which may be optimally described via the particular homography. For example, segment sections may be combined into segments using a bottom-up method in various iteration steps. According to one exemplary embodiment, the stated three homography parameters are used to characterize the segment in question. For example, the normal direction (orientation) is taken as a simple classification feature. For example, a segment may be associated with a roadway or an object, using a so-called stixel representation. The assignment of a stixel segment into one of the two classes takes place, for example, using a classifier which makes a decision based on an orientation parameter. For example, a stixel that is valid for the one normal direction of less than 45° is classified as an object, and a stixel for the one normal direction of greater than 45° is classified as a roadway stixel. Even further plausibility checks may be carried out via the two other parameters, i.e., the scaled vertical translation and horizontal translation, for example, comparison with otherwise available information concerning the roadway plane. In addition, these other parameters may also be used as input for more extensive processing, for example a distance estimation, motion detection of objects, or estimation of the profile and/or structure of the roadway surface.

With knowledge of the homography parameters it is possible, for example, to reconstruct the movement of points on a plane. Accordingly, the vertical flux may be modeled based on the homography mapping.

According to this exemplary embodiment, first area 511, second area 512, and third area 513, as the result of the homography estimation, represent different slopes or orientations of the depicted planes. Thus, the homography estimation for first area 511 results in first parameters via which segment 205 is associatable with the roadway plane, for second area 512 results in second parameters via which segment 509 is associatable with the object plane, and for third area 513 results in third parameters via which segment 207 is associatable with the background plane.

The different areas 511, 512, 513 each show a distance of the individual depicted camera image contents such as a background, an object, a roadway, from the vehicle.

According to one exemplary embodiment, when second segment 509 that is associatable with the object plane is recognized, the object signal described with reference to FIG. 1 is provided in order to indicate a recognized object.

According to one exemplary embodiment, more than one image line is used. Objects that are depicted in different areas of the camera image may be recognized using multiple image lines. For example, a first image line extends through an area of the first camera image depicted by a first lane, and a second image line extends through an area of the first camera image depicted by a second lane. In each case a flux profile may be formed, segmented, and evaluated for both image lines and optionally further image lines, as described, in order to recognize images of objects that are intersected by the particular image lines.

FIG. 6 shows a schematic illustration of a flux profile 200 according to one exemplary embodiment. This may be flux profile 200 described in FIG. 5, segments 205, 207, 509 being illustrated, at least in part, as solid lines that represent a plane (the roadway plane, the background plane, and the object plane, respectively). As the result of an appropriate bottom-up method, FIG. 6 correspondingly illustrates final segments 205, 207, 509, which in each case represent a plane (background, object, roadway).

FIG. 7 shows a flowchart of a method 700 according to one exemplary embodiment for recognizing an object using a mono camera for a vehicle. This may be a method 700 which may be carried out by the device described with reference to the preceding figures.

Method 700 includes a step 705 of reading in a first image signal, a step 710 of reading in a second image signal, a step 715 of selecting, a step 720 of identifying, a step 725 of forming, a step 730 of segmenting, and a step 735 of determining.

The image signals read in in steps 705, 710 are read in, for example, via an interface to the mono camera. Thus, the first image signal may represent a first camera image, and the second image signal may represent a second camera image. First pixels situated on an image line of the first camera image are selected from the first image signal in step 715 of selecting. For example, for this purpose an image column of the first camera image is read out, and the read-out pixels are used as the first pixels. Second pixels corresponding to the first pixels are searched for in the second camera image and identified as the second pixels in the second image signal in step 720 of identifying. Based on FIG. 4, for example one of the first pixels of the first camera image depicts a section of the shown license plate of the vehicle. For this first pixel, a corresponding second pixel is searched for in the second camera image that depicts the same section of the license plate in the second camera image. Similarly, for all first pixels, corresponding second pixels are searched for and used in step 725 to form a flux signal. For this purpose, for example a flux vector is formed for each pair of corresponding first and second pixels. The totality of the flux vectors is illustrated, for example using the flux signal, as an optical flux profile for the first pixels situated along the image line. The flux profile represented by the flux signal is segmented into a plurality of segments in step 730 of segmenting. Due to different characteristics of the segments, a plane in the vehicle surroundings that is depicted by the first camera image and intersected by the image line may be associated with each of the segments. The segments are used in step 735 of determining in order to determine an object signal that represents a recognized object. For example, the segment that corresponds to an object plane is picked out from the plurality of segments and used for determining the object signal.

According to this exemplary embodiment, method 700 optionally also includes a step 740 of providing and/or a step 745 of outputting. A warning signal is provided to a warning device of the driving assistance system in the step of providing 740, using the object signal.

A braking signal is output to a braking device of the vehicle in the step of outputting 745, using the object signal, in order to brake the vehicle.

Described method 700 may be carried out repeatedly in order to read in further image signals and to determine at least one further object signal. Thus, according to one specific embodiment, method 700 also includes a step of reading in a third image signal, a step of reading in a fourth image signal, a step of further selecting, a step of further identifying, a step of further forming, a step of further segmenting, and a step of further determining. In the step of reading in the third image signal, a third image signal is read in that represents a third camera image, recorded by the mono camera, that depicts the surroundings of the vehicle. In the step of reading in the fourth image signal, at least one fourth image signal is read in that represents a fourth camera image, recorded by the mono camera, that depicts the surroundings of the vehicle. In the step of further selecting, third pixels situated on a further image line of the third camera image are selected from the third image signal, it being possible for the further image line to correspond to the image line. In the step of identifying, fourth pixels from the fourth image signal are identified, the fourth pixels corresponding to the third pixels. In the step of further forming, a further flux signal is formed using the third pixels and the fourth pixels, the further flux signal representing an optical flux profile for the third pixels situated along the further image line. In the step of further segmenting, the flux profile represented by the further flux signal is segmented into a plurality of further segments, each of which represents a further plane in the vehicle surroundings. In the step of further determining, the further object signal representing the recognized object or a further recognized object is determined, using the plurality of further segments.

The third camera image and the fourth camera image may be camera images of the mono camera that directly follow one another in sequence. Likewise, the second camera image and the third camera image may be camera images of the mono camera that directly follow one another in sequence.

What is claimed is:

1. A method for recognizing an object for a vehicle, the vehicle including a mono camera, the method comprising the following steps:
   reading in a first image signal that represents a first camera image, recorded by the mono camera, that depicts surroundings of the vehicle;
   reading in at least one second image signal that represents a second camera image, recorded by the mono camera, that depicts the surroundings of the vehicle;
   selecting first pixels, situated on an image line of the first camera image, from the first image signal;
   identifying second pixels from the second image signal, the second pixels corresponding to the first pixels;
   forming a flux signal using the first pixels and the second pixels, the flux signal representing an optical flux profile for the first pixels situated along the image line;
   segmenting the flux profile represented by the flux signal into a plurality of segments, each of which represents a plane in the surroundings of the vehicle; and
   determining an object signal that represents a recognized object, using at least one of the plurality of segments.

2. The method as recited in claim 1, wherein in the step of selecting, the first pixels situated on the image line of the first camera image formed as an image column are selected from the first image signal.

3. The method as recited in claim 1, wherein in the step of segmenting, the flux profile is segmented using a model that is described via a homography.

4. The method as recited in claim 3, wherein the homography, as homography parameters, includes an angle of the image line, a scaled vertical translation, and a scaled horizontal translation, the homography parameters being used for segmenting the flux profile.

5. The method as recited in claim 1, wherein in the step of segmenting, the plurality of segments, which each represent the plane, represent a background plane associated with a background, and/or an object plane associated with an object, and/or a roadway plane associated with a roadway, are segmented.

6. The method as recited in claim 1, wherein in the step of segmenting, the flux profile is subdivided into different areas in order to form the plurality of segments.

7. The method as recited in claim 1, wherein the steps of the method are carried out repeatedly in order to read in further image signals and to determine at least one further object signal.

8. The method as recited in claim 1, further comprising:
   providing a warning signal to a warning device of a driving assistance system, using the object signal.

9. The method as recited in claim 1, further comprising:
   outputting a braking signal to a braking device of the vehicle, using the object signal, to brake the vehicle.

10. A device for recognizing an object for a vehicle, the vehicle including a mono camera, the device configured to:
    read in a first image signal that represents a first camera image, recorded by the mono camera, that depicts surroundings of the vehicle;
    read in at least one second image signal that represents a second camera image, recorded by the mono camera, that depicts the surroundings of the vehicle;
    select first pixels, situated on an image line of the first camera image, from the first image signal;
    identify second pixels from the second image signal, the second pixels corresponding to the first pixels;
    form a flux signal using the first pixels and the second pixels, the flux signal representing an optical flux profile for the first pixels situated along the image line;
    segment the flux profile represented by the flux signal into a plurality of segments, each of which represents a plane in the surroundings of the vehicle; and
    determine an object signal that represents a recognized object, using at least one of the plurality of segments.

11. A camera system for a vehicle, comprising:
    a mono camera; and
    a device for recognizing an object for a vehicle, the device configured to:
      read in a first image signal that represents a first camera image, recorded by the mono camera, that depicts surroundings of the vehicle,
      read in at least one second image signal that represents a second camera image, recorded by the mono camera, that depicts the surroundings of the vehicle,
      select first pixels, situated on an image line of the first camera image, from the first image signal,
      identify second pixels from the second image signal, the second pixels corresponding to the first pixels,
      form a flux signal using the first pixels and the second pixels, the flux signal representing an optical flux profile for the first pixels situated along the image line,
      segment the flux profile represented by the flux signal into a plurality of segments, each of which represents a plane in the surroundings of the vehicle, and
      determine an object signal that represents a recognized object, using at least one of the plurality of segments.

12. A non-transitory machine-readable memory medium on which I stored a computer program for recognizing an object for a vehicle, the vehicle including a mono camera, the computer program, when executed by a computer, causing the computer to perform the following steps:
    reading in a first image signal that represents a first camera image, recorded by the mono camera, that depicts surroundings of the vehicle,
    reading in at least one second image signal that represents a second camera image, recorded by the mono camera, that depicts the surroundings of the vehicle,
    selecting first pixels, situated on an image line of the first camera image, from the first image signal,
    identifying second pixels from the second image signal, the second pixels corresponding to the first pixels,
    forming a flux signal using the first pixels and the second pixels, the flux signal representing an optical flux profile for the first pixels situated along the image line,
    segmenting the flux profile represented by the flux signal into a plurality of segments, each of which represents a plane in the surroundings of the vehicle, and
    determining an object signal that represents a recognized object, using at least one of the plurality of segments.

* * * * *